(12) United States Patent
Feno et al.

(10) Patent No.: US 9,893,609 B1
(45) Date of Patent: Feb. 13, 2018

(54) METHOD TO OPERATE A RESONANT CONVERTER AT A CHARACTERISTIC FREQUENCY OF THE POWER STAGE

(71) Applicant: PAI Capital LLC, San Jose, CA (US)

(72) Inventors: Ivan Feno, Bertschikon (CH); Matthias Uhlmann, Fällanden (CH)

(73) Assignee: BEL POWER SOLUTIONS INC., Santa Clara, CA (US)

( * ) Notice: Subject to any disclaimer, the term of this patent is extended or adjusted under 35 U.S.C. 154(b) by 0 days.

(21) Appl. No.: 14/705,069

(22) Filed: May 6, 2015

Related U.S. Application Data

(60) Provisional application No. 62/003,949, filed on May 28, 2014.

(51) Int. Cl.
*H02M 3/335* (2006.01)
*H02M 1/42* (2007.01)

(52) U.S. Cl.
CPC ..... *H02M 1/4241* (2013.01); *H02M 3/33507* (2013.01)

(58) Field of Classification Search
CPC .................................................. H02M 3/335
USPC ..... 363/21.03, 84, 88, 89, 90, 125, 126, 127
See application file for complete search history.

(56) References Cited

U.S. PATENT DOCUMENTS

| | | |
|---|---|---|
| 5,325,283 A | 6/1994 | Farrington et al. |
| 5,638,260 A | 6/1997 | Bees |
| 6,016,257 A * | 1/2000 | Chang .............. H02M 7/53803 363/149 |
| 6,343,025 B1 | 1/2002 | Nagahara |
| 6,396,252 B1 | 5/2002 | Culpepper et al. |
| 6,836,414 B1 | 12/2004 | Batarseh et al. |
| 7,098,642 B2 | 8/2006 | Lipcsei et al. |
| 8,018,740 B2 | 9/2011 | Sun et al. |
| 8,503,195 B1 | 8/2013 | Mogilevski |
| 9,166,498 B2 * | 10/2015 | Feno ..................... H02M 7/219 |
| 2004/0212356 A1 | 10/2004 | Dowlatabadi |
| 2006/0221528 A1 | 10/2006 | Li et al. |
| 2007/0013349 A1 | 1/2007 | Bassett |
| 2007/0018619 A1 | 1/2007 | Endo |
| 2008/0106243 A1 | 5/2008 | Cheon et al. |
| 2012/0063177 A1 * | 3/2012 | Garrity .................. H02J 3/383 363/37 |
| 2015/0092450 A1 * | 4/2015 | Feno ................. H02M 3/33592 363/17 |

* cited by examiner

*Primary Examiner* — Adolf Berhane
*Assistant Examiner* — Nusrat Quddus
(74) *Attorney, Agent, or Firm* — Patterson Intellectual Property Law, P.C.; Mark J. Patterson; Gary L. Montle

(57) ABSTRACT

A method is provided of operating a resonant converter, the converter having a controller and power stage and providing an output voltage, by determining a characteristic frequency of the power stage. The characteristic frequency is defined as a natural oscillation frequency of the power stage observed right after the power stage control signals from the controller are disabled. The converter is operated at the characteristic frequency during ramp-up or ramp-down of the converter output voltage and/or during overload or input overvoltage conditions.

20 Claims, 5 Drawing Sheets

METHOD TO OPERATE A RESONANT CONVERTER AT A CHARACTERISTIC FREQUENCY OF THE POWER STAGE

CROSS-REFERENCES TO RELATED APPLICATIONS

This application claims benefit of the following patent application(s) which is/are hereby incorporated by reference: U.S. Provisional Patent Application No. 62/003,949, dated May 28, 2014.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

This invention relates generally to electrical power conversion methods and circuits, and more particularly to isolated soft-switched resonant converters as are required to provide controlled and reliable startup.

A typical method to regulate a resonant converter is a frequency modulation control scheme (PFM) with a control to frequency dependency, as shown in FIG. 1. The switching frequency Fsw decreases linearly as the control signal Vctrl increases. Accordingly, the output power of the converter increases towards nominal/maximal output power. The operation of a resonant converter close to its series-resonance requires only small changes in the switching frequency because only a small change in the gain of the converter is required to compensate for load changes. This is much different if the resonant converter output voltage is regulated over a wide voltage range, as is typically required during start-up or shut-down of the converter. In such cases the converter gain needs to go to zero, which requires a theoretically impractical infinite switching frequency.

Therefore, the commonly used limited frequency control range has certain limitations during startup of the resonant converter. Typically, a resonant converter cannot regulate its output to zero or low voltages, resulting in internal/external excessive current stress, hard switching, or the inability to linearly ramp-up the output. If a linear ramp-up or ramp-down is required, additional measures are needed to enable a closed loop ramp control.

One possible solution is a pulse gating control so that when the output voltage overshoots the reference value, the control pulses for the primary switches are disabled. When the output voltage falls below the reference value, the control pulses are enabled again. This helps control the output voltage during ramp-up/down. However, because of the limited frequency range of the control circuit the power stage is working in hard-switching conditions and can potentially fail or its reliability can be compromised. This happens across load and input voltage ranges.

U.S. Pat. No. 8,018,740 describes another approach based on switching between operation modes, where a converter is controlled by pulse width modulation at a constant maximum frequency during the startup and by a variable frequency mode during normal operation as depicted in FIG. 2. In this case, the switching frequency increases as the control voltage decreases up to a certain point from where the frequency is clamped, and the duty cycle is decreased to lower the transferred energy as depicted in FIG. 3. This provides a solution for a substantially linear startup but results in: (a) hard switching operation for the primary switching devices, thereby causing power stage failures in certain circumstances; and (b) the output voltage exhibits an excessive ripple/oscillation due to a non-monotonic transfer function of the resonant converter in PWM mode.

The present invention introduces a method to control the resonant converter close to its power stage characteristic frequency (CRF) to achieve zero-voltage-switching (ZVS) across a substantial load and output voltage range, while at the same time providing a closed loop control for output voltage during various operating conditions including output voltage ramp-up, ramp-down or steady-state operating conditions.

BRIEF SUMMARY OF THE INVENTION

In one aspect, the present invention provides a method of operating a resonant converter, the converter having a controller and power stage and providing an output voltage. The method includes determining a characteristic frequency of the power stage, the characteristic frequency defined as a natural oscillation frequency of the power stage observed right after the power stage control signals from the controller are disabled, and operating the converter at the characteristic frequency during ramp-up or ramp-down of the converter output voltage.

According to another aspect, the method includes operating the converter at the characteristic frequency during overload or input overvoltage conditions.

In a further aspect, the method further includes operating the controller in a burst mode to completely switch off drive pulses to the power stage if the converter output power is too high to maintain the output voltage regulation.

In some embodiments, the controller is programmed to provide a hysteresis to the drive pulse switch-on/switch-off thresholds and may be further programmed to provide a time hysteresis to the drive pulses.

In certain embodiments, the controller is programmed to provide one or more of (a) assuring a minimum number of drive pulses with no limitation of off time; (b) assuring a minimum off time with no limitation of drive pulses; and (c) assuring a minimum number of drive pulses and a minimum off time.

In some embodiments, the method may further include adapting a maximum drive frequency of the controller as a function of the output voltage level whereby a change in maximum frequency follows substantially a change of the characteristic frequency of the converter as function of output voltage, and the controller adapts the drive pulse width to maintain a substantially zero volt switching (ZVS) operation of the power stage.

In some embodiments, the method may further include operating the converter at the characteristic frequency during normal operating conditions.

DETAILED DESCRIPTION OF THE INVENTION

Figure 1:
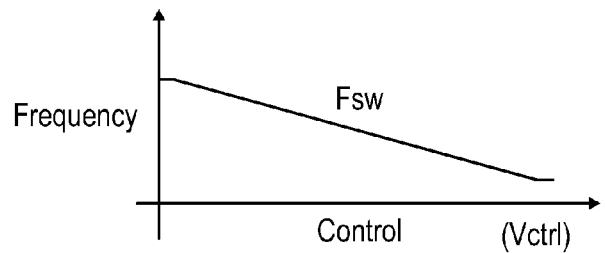
FIG. 1 graphically depicts a basic prior art frequency modulation used to regulate a resonant converter.
Figure 2:
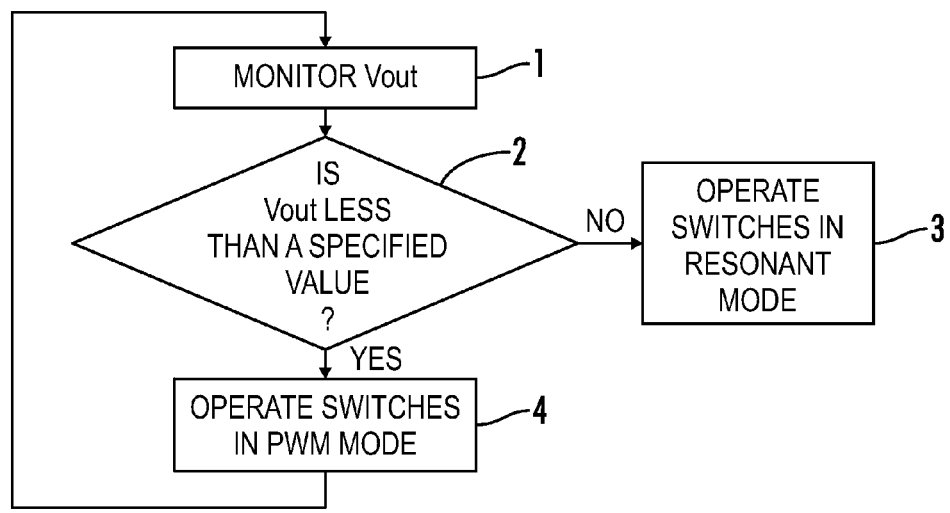
FIG. 2 is a flow chart of a conventional method providing output voltage regulation of a resonant converter down to zero by means of a PWM control applied at low output voltages.
Figure 3:
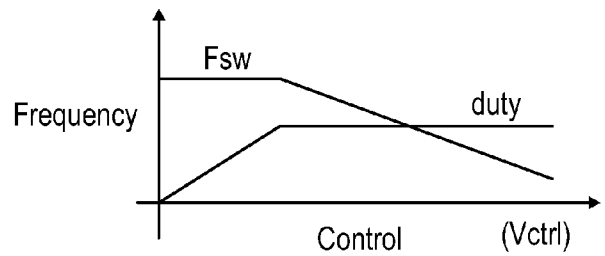
FIG. 3 graphically depicts Fsw and duty cycle dependencies according to the method of FIG. 2.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Referring generally to FIGS. 1-8, various embodiments of a resonant converter and methods of operation at a characteristic frequency of the associated power stage may now be described. Where the various figures may describe embodiments sharing various common elements and features with other embodiments, similar elements and features are given the same reference numerals and redundant description thereof may be omitted below.

Because of the energy stored in the different resonant components and parasitic elements of the power stage, the power stage of a resonant converter will continue to resonate for a period after control pulses to associated switching devices have stopped. The characteristic frequency (CRF) of the power stage may be defined as the natural oscillation frequency of the power stage which can be observed right after the power stage control signals are disabled.

Figure 6:
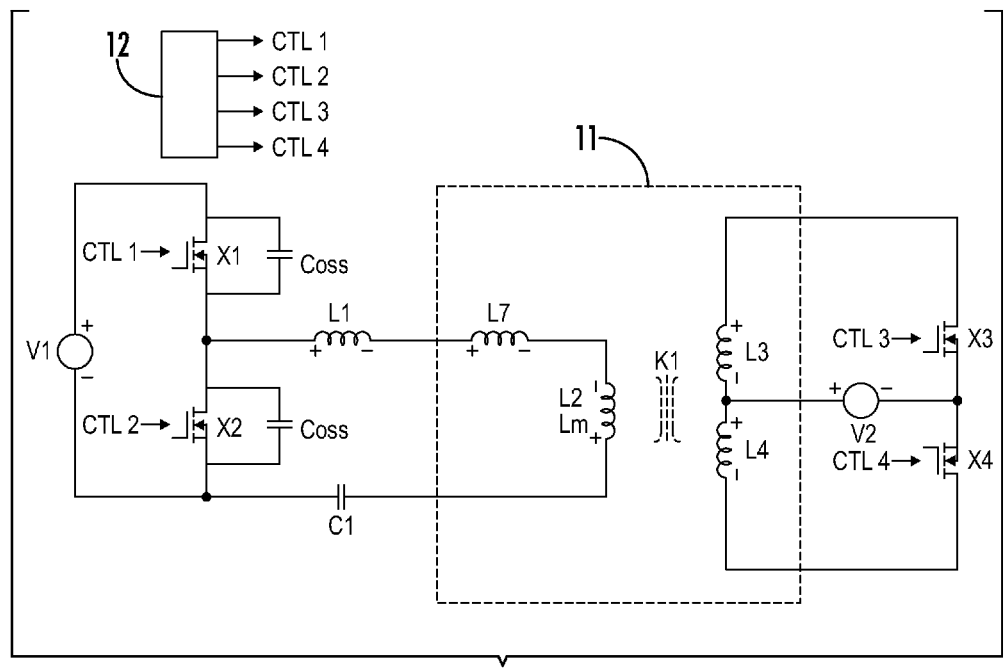
FIG. 6 is a schematic of a simulation model used to demonstrate a method according to an embodiment of the present disclosure.

The novel control method disclosed herein takes advantage of operating the power stage at, or close to, the CRF. FIG. 6 depicts a simulation schematic of a typical LLC type resonant converter. The converter includes a voltage source V1, a power stage including switches X1 and X2 operated at zero-volt switched (ZVS) conditions, a resonant tank including resonant inductor L1 and resonant capacitor C1, an isolation transformer 11, a secondary rectifier including switches X3 and X4, and an output filter/load represented by voltage source V2. The secondary rectifier can be realized with diodes or with actively controlled switches. The switches X1-X4 (in case X3-X4 are active devices, otherwise only X1-X2) are controlled via control signals CTL1-CTL4, respectively, produced by a controller 12 which would typically regulate the output voltage or current.

Figure 4:
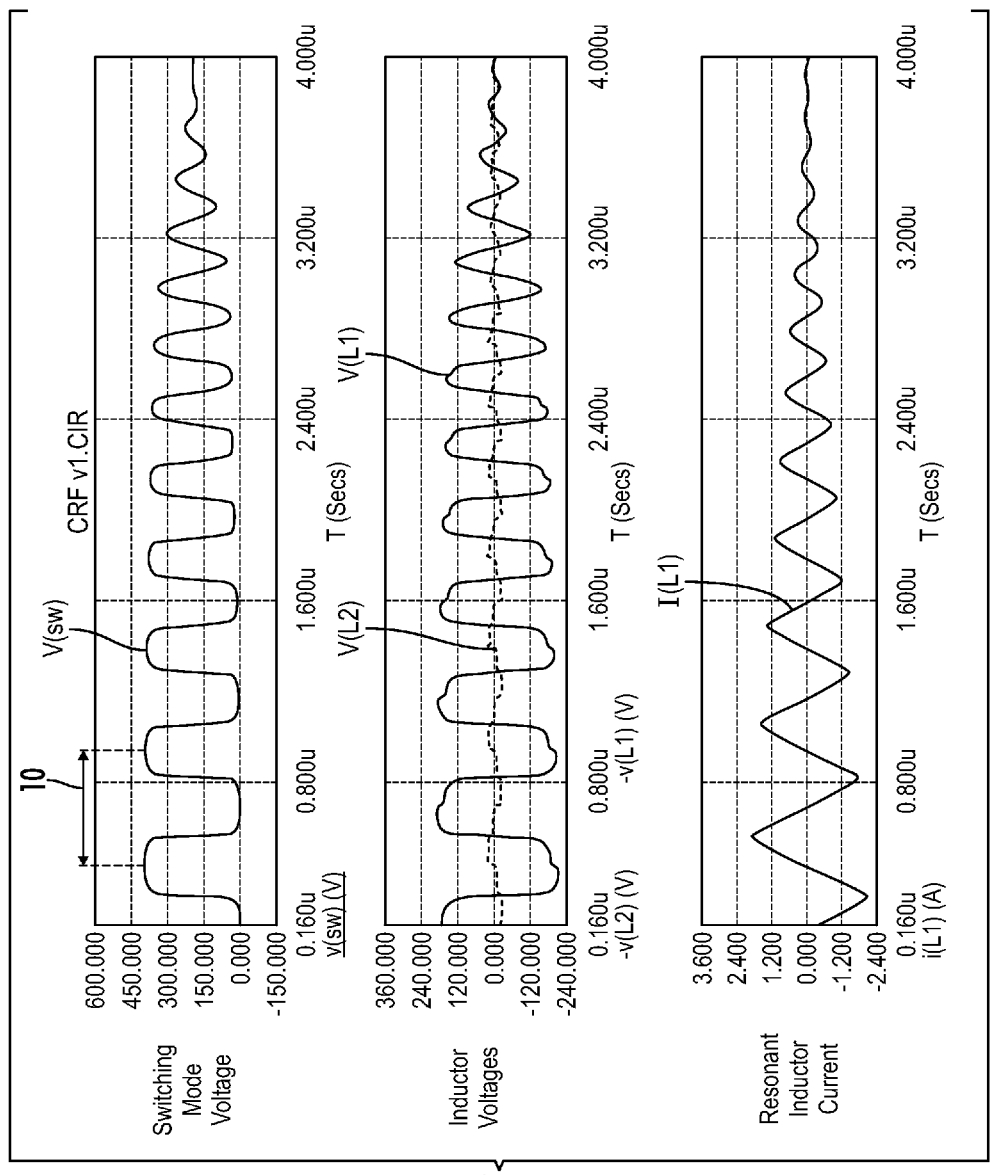
FIG. 4 graphically depicts a characteristic oscillation of the resonant converter power stage observed after the control pulses for the switching devices operating under ZVS have been disabled (Vo=0V).
Figure 5:
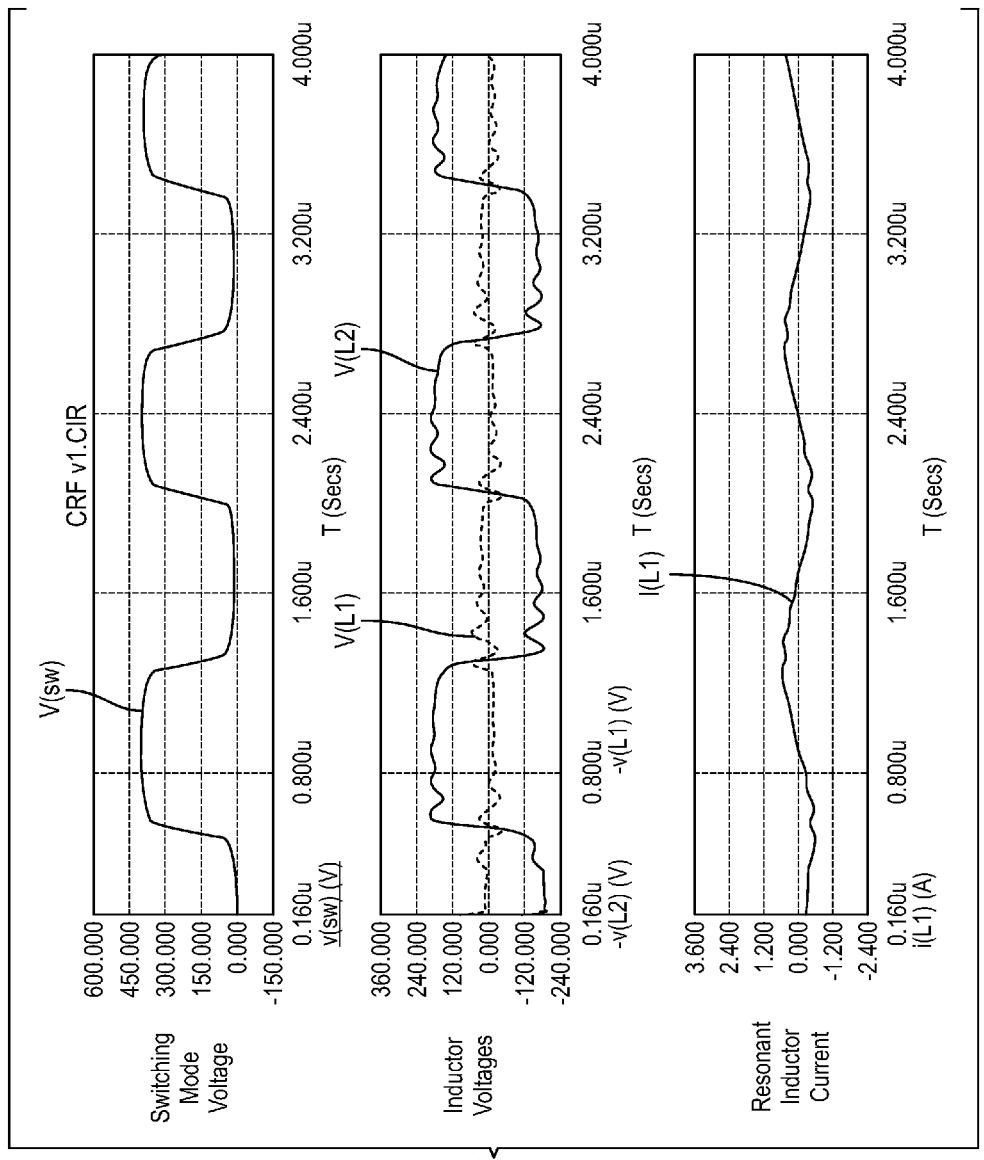
FIG. 5 graphically depicts a characteristic oscillation of the resonant converter power stage observed after the control pulses for the switching devices operated under ZVS have been disabled (Vo=Vo_nom).

The CRF of the converter depends on a number of physical elements and operating conditions, including input and output voltages. Therefore, to determine the CRF, the converter is setup to a specific operating condition (e.g. short circuit at 0V output or 50% of the nominal output) and with the driving pulses for the switches operating under ZVS conditions (often primary power stage switches) are disabled. FIG. 4 depicts the converter waveforms for short circuit conditions after the control pulses to the converter have been disabled. The switching node voltage v(sw) freely oscillates at a specific CRF and the oscillation gradually disappears in a damped manner. As the amplitude of the oscillation decreases, the oscillation frequency increases due to reduced Coss capacitance of switches X1-X2 at high Vds voltage. The current through the resonant inductor i(L1) has typically a triangular shape due to the non-linear Coss nature of the switches X1 and X2.

The CRF of interest is measured after the driving pulses have been disabled and at the time window where the switching node voltage v(sw) still reaches the potential of the input bus rails (e.g. 0 and ~400V) as indicated by reference 10. This provides ZVS operation of the switches when the converter is operating under CRF in a wide range of output voltages and output currents.

As mentioned above, the CRF will depend on the operating conditions of the converter and on the several parasitic components that are involved. At short circuit conditions (FIG. 4), the CRF is primarily governed by the resonant inductor L1 and the Coss capacitance of switches X1 and X2. The effect of the isolation transformer and all secondary components is small because v(L2) is relatively small compared to v(L1) as depicted in FIG. 4. However, if the inductance of the resonant inductor L1 is small in comparison to the total leakage inductance of the isolation transformer, then the leakage inductance influences the CRF as well.

In contrast, for open circuit conditions (FIG. 5), the CRF is primarily governed by the magnetizing inductance L2 and the Coss capacitance of switches X1 and X2. The effect of other converter components or parasitic components is less significant.

If a resonant converter is operated close or directly at the CRF, several advantages can be observed. First, the gain of the Vo-to-Vin transfer function of the converter is significantly reduced. This helps to significantly enlarge the regulation range of the converter and the converter can provide a controlled output voltage ramp-up or ramp-down, including linear rise or linear fall. Also, the switches operating under ZVS may maintain this condition over a substantially wider range of output voltages and currents. Further, body diode conduction in switches operating under ZVS may be remarkably reduced, or even completely avoided.

In one embodiment of the invention, operation of the converter approximately or directly at the CRF is used during a startup or a shutdown of the converter with one or more of the advantages mentioned above. In this case the converter is regulated in a closed loop to satisfy the output voltage ramp-up or ramp-down requirements.

In another embodiment of the invention, operation of the converter at approximately or directly at the CRF is used during an overload or input overvoltage conditions with one or more of the same advantages as mentioned above. The converter is regulated in a closed loop to regulate output voltage or output current.

Figure 7:
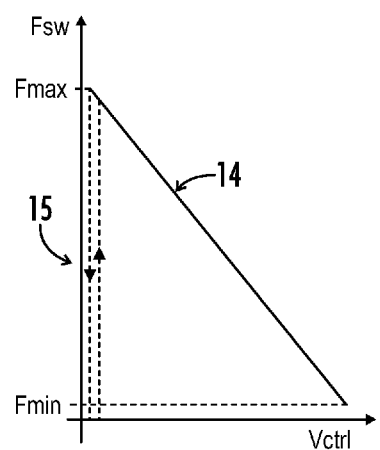
FIG. 7 graphically depicts a PFM technique according to one embodiment of the present disclosure.

In either or both of the aforementioned embodiments, a PFM (frequency modulation) may be used to control the output voltage/current according to FIG. 7, whereas the switching frequency Fsw depends on the control voltage Vctrl according to line 14. As the control voltage Vctrl decreases, the switching frequency Fsw is increased up to Fmax which corresponds approximately to the CRF. If the transferred output power is still too high to maintain the output voltage regulation, a burst mode 15 inhibits the driving pulses for the power stage. As the output voltage drops, Vctrl increases and the driving pulses are enabled again. A small hysteresis is implemented to keep the burst mode behavior predictable. Optionally, a timing hysteresis can be implemented assuring a minimum number of pulses are generated, or a minimum off time is provided, or, minimum number of pulses and minimum off time is provided.

In some embodiments, the series resonant frequency Fsr of the resonant tank is ~250 kHz, the minimum control frequency Fmin ~150 kHz and Fmax ~1.7 MHz which again corresponds to the CRF. The prior art solution would have a saturation level for Fsw at ~450 kHz.

Because the switching frequency can increase to high values, but the time to transition the voltage at the V(SW) node from high to low and low to high is basically constant, the pulse width of the driving pulses to switches X1/X2 needs to change as a function of the switching frequency so that ZVS can be maintained. This also applies to the delay between the driving pulses between X1/X2 and X3/X4 and also the dead time of X3/X4. Unlike the prior art, where the pulse widths are reduced so much as to significantly lower the power transfer and hence lose the benefit of ZVS, here the pulse width is only reduced so far as to be able to maintain ZVS.

Figure 8:
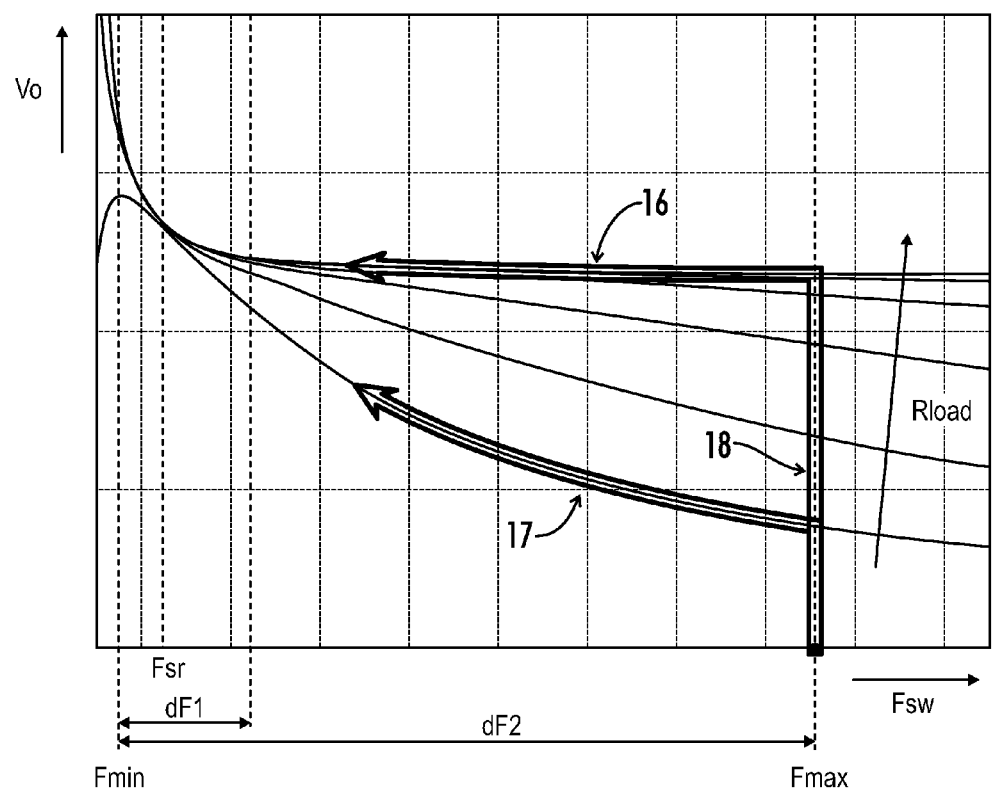
FIG. 8 graphically illustrates the gain characteristics and operation mode trajectory of the converter according to one embodiment of the present disclosure.

The gain characteristic of some embodiments is shown in FIG. 8. The overall control switching frequency range is depicted by the reference dF2. The converter is started at Fmax. As the output voltage increases, the switching frequency follows trajectory 17 for a nominal load condition or trajectory 16 for a no load condition. Both trajectories form an envelope of the operation points during start-up if the input voltage of the converter is constant and the load is variable. The vertical part 18 represents operation in burst mode while Fsw is fixed at or close to CRF.

When start-up ramping of the output voltage is finished, the operating frequency range of the converter is reduced to the dF1 range and the converter uses the dF1 range during normal operation. If load conditions or any other Vin/Vout conditions (including ramp-down/shut-down) require decreasing gain/output power, operational frequency range of PFM can be again extended to dF2 range.

In an alternative embodiment of the invention, the Fmax is not constant. Instead, Fmax is adaptive to reflect a variation of CRF with dependence on output voltage, load current or input voltage respectively. In this case the vertical line 18 on FIG. 8 is in general a curve which reflects the variation of CRF as mentioned above.

In yet another embodiment of the invention, operation of the converter at approximately or directly at the CRF is used during normal operating conditions. The converter is regulated in a closed loop to regulate output voltage or output current or in an open loop.

In various embodiments as described herein, driving pulses for X3 and X4 are inhibited to further decrease gain of transfer function of the converter during the start-up, shut-down, overload or input overvoltage conditions unless continuous operation at these conditions is required.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A method of operating a resonant converter, the converter having a controller and power stage and providing an output voltage, the method comprising:
   with the power converter at a predetermined operating condition, disabling power stage control signals from the controller;
   determining a characteristic frequency of the power stage, the characteristic frequency defined as a natural oscillation frequency of the power stage observed right after the power stage control signals from the controller are disabled;
   operating the converter at the determined characteristic frequency during normal operating conditions;
   operating the converter at the determined characteristic frequency during ramp-up or ramp-down of the converter output voltage; and adapting a maximum drive frequency of the controller as a function of the characteristic frequency of the converter, whereby a change in the characteristic frequency of the converter change as a function of output voltage.

2. The method of claim 1, further comprising operating the converter at the characteristic frequency during overload or input overvoltage conditions.

3. The method of claim 1, further comprising operating the controller in a burst mode to switch off drive pulses to the power stage if the converter output power is too high to maintain the output voltage regulation.

4. The method of claim 3, wherein the controller is programmed to provide a time hysteresis to the drive pulse switch-on/switch-off thresholds.

5. The method of claim 1, further comprising:
adapting controller drive pulse width to maintain substantially ZVS operation of the power stage.

6. The method of claim 1, wherein the predetermined operating condition comprises a short circuit of the converter at zero voltage output.

7. The method of claim 1, wherein the predetermined operating condition comprises an open circuit at the converter output.

8. A power converter comprising:
a power stage comprising a plurality of switching elements, one or more of the switching elements controlled for zero volt switching operation;
a resonant stage comprising an inductor and a capacitor;
an isolation transformer; and
a controller configured to
operate the converter at a characteristic frequency of the power stage, wherein the characteristic frequency is defined as a natural oscillation frequency of the power stage observed right after power stage control signals from the controller are disabled for the one or more switching elements having zero volt switching operation,
adapt a maximum drive frequency of the controller as a function of the output voltage level, wherein a change in the maximum drive frequency follows substantially a change of the characteristic frequency of the converter as function of output voltage, and
adapt the drive pulse width to maintain a substantially constant dead time between the pulses.

9. The power converter of claim 8, wherein the controller is further configured for closed-loop or open loop operation of the converter.

10. The power converter of claim 9, wherein the controller operates the converter at the determined characteristic frequency during startup and shutdown of the converter to provide linear ramp-up and ramp-down of the converter output voltage, respectively.

11. The power converter of claim 9, wherein the controller operates the converter in a burst mode to completely switch off drive pulses to the power stage if the converter output power is too high to maintain the output voltage regulation.

12. The power converter of claim 8, the controller adapting the drive pulse width to maintain substantially ZVS operation of the power stage.

13. A method of operating a resonant converter, the converter having a controller and power stage and providing an output voltage, the method comprising:
with the power converter at a predetermined operating condition, disabling power stage control signals from the controller;
determining a characteristic frequency of the power stage, the characteristic frequency defined as a natural oscillation frequency of the power stage observed right after the power stage control signals from the controller are disabled;
operating the converter at the determined characteristic frequency during normal operating conditions;
operating the converter at the determined characteristic frequency during ramp-up or ramp-down of the converter output voltage;
operating the controller in a burst mode to switch off drive pulses to the power stage if the converter output power is too high to maintain the output voltage regulation; and
providing a time hysteresis to the drive pulses, further providing one or more of: assuring a minimum number of drive pulses with no limitation of off time, assuring a minimum off time with no limitation of drive pulses, and assuring a minimum number of drive pulses and a minimum off time.

14. The method of claim 13, further comprising:
adapting controller drive pulse width to maintain substantially ZVS operation of the power stage.

15. The method of claim 13, further comprising:
operating the converter at the characteristic frequency during overload or input overvoltage conditions.

16. A method of operating a resonant converter, the converter having a controller and power stage and providing an output voltage, the method comprising:
with the power converter at a predetermined operating condition, disabling power stage control signals from the controller;
determining a characteristic frequency of the power stage, the characteristic frequency defined as a natural oscillation frequency of the power stage observed right after the power stage control signals from the controller are disabled;
operating the converter at the determined characteristic frequency during normal operating conditions;
operating the converter at the determined characteristic frequency during ramp-up or ramp-down of the converter output voltage;
operating the controller in a burst mode to switch off drive pulses to the power stage if the converter output power is too high to maintain the output voltage regulation;
adapting a maximum drive frequency of the controller as a function of the output voltage level, whereby a change in the maximum drive frequency follows substantially a change of the characteristic frequency of the converter as function of output voltage, and
adapting a drive pulse width to maintain a substantially constant dead time between drive pulses to the power stage.

17. The method of claim 16, further comprising:
operating the converter at the characteristic frequency during overload or input overvoltage conditions.

18. A power converter comprising:
a power stage comprising a plurality of switching elements, one or more of the switching elements controlled for zero volt switching operation;
a resonant stage comprising an inductor and a capacitor;
an isolation transformer; and
a controller configured to
operate the converter at a characteristic frequency of the power stage, wherein the characteristic frequency is defined as a natural oscillation frequency of the power stage observed right after power stage control signals from the controller are disabled for the one or more switching elements having zero volt switching operation, and adapt a maximum drive frequency of the controller to follow substantially a change of the characteristic frequency of the converter.

19. The power converter of claim 18, the controller adapting the drive pulse width to maintain substantially ZVS operation of the power stage.

20. The method of claim 18, further comprising:
operating the converter at the characteristic frequency during overload or input overvoltage conditions.

* * * * *